Aug. 20, 1935. A. RAMBOLD Re. 19,675

CONVEYING AND FLATTENING DEVICE FOR SMALL BAGS FILLED WITH TEA OR THE LIKE

Original Filed May 1, 1931 3 Sheets-Sheet 1

Inventor:

Adolf Rambold by Louis Barnett

Aug. 20, 1935. A. RAMBOLD Re. 19,675
CONVEYING AND FLATTENING DEVICE FOR SMALL BAGS FILLED WITH TEA OR THE LIKE
Original Filed May 1, 1931 3 Sheets-Sheet 2
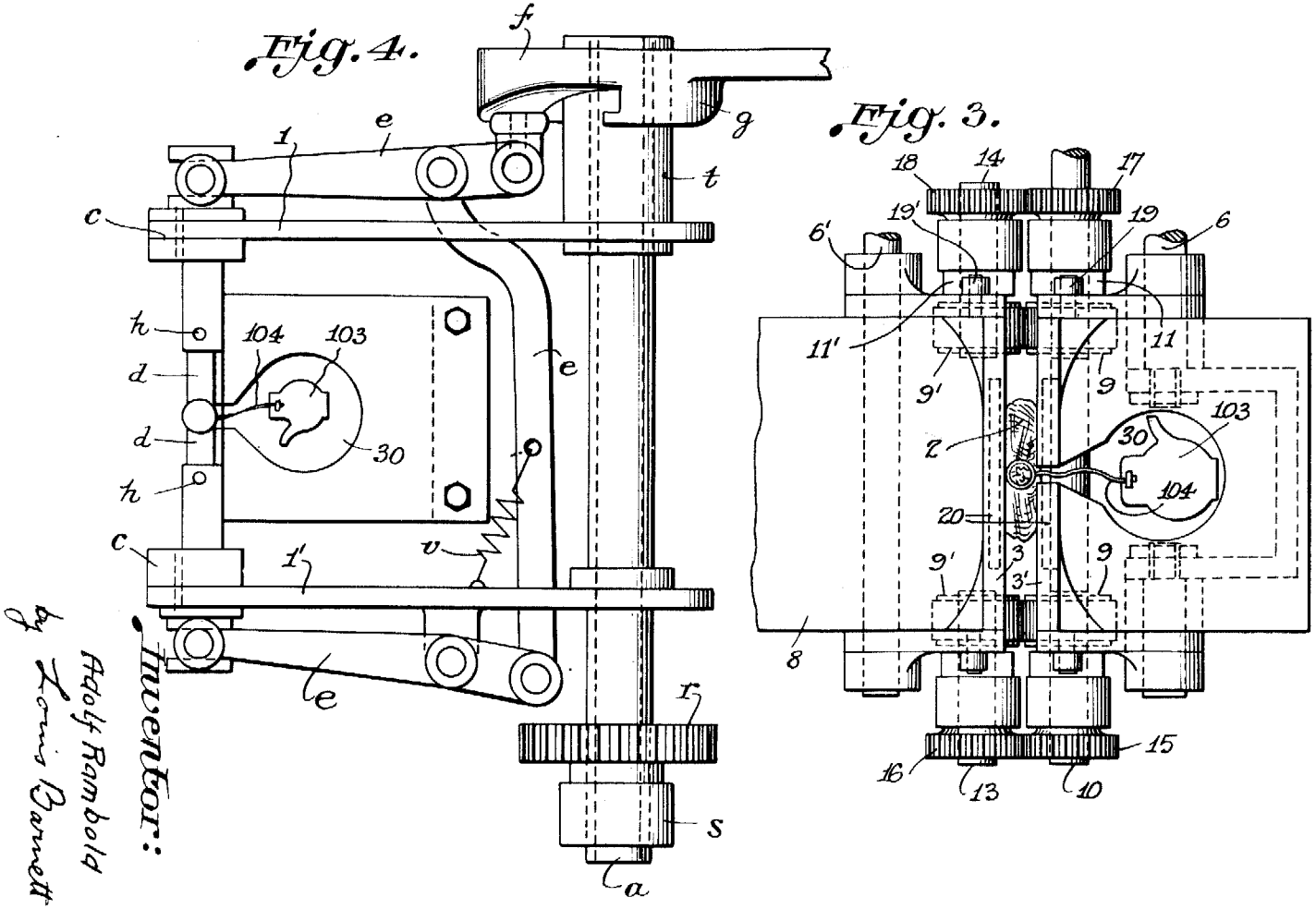

Inventor:

Adolf Rambold
by Louis Barnett

Reissued Aug. 20, 1935 Re. 19,675

UNITED STATES PATENT OFFICE 19,675

CONVEYING AND FLATTENING DEVICE FOR SMALL BAGS FILLED WITH TEA OR THE LIKE

Adolf Rambold, Dresden, Germany, assignor to Millie Patent Holding Co., Inc., New York, N. Y., a corporation of New York Original No. 1,976,691, dated October 9, 1934, Serial No. 534,424, May 1, 1931. Application for reissue April 4, 1935, Serial No. 14,640. In Germany October 18, 1930

17 Claims. (Cl. 93—2)

This invention relates to the manufacture of small bags of tea and other like essence containing products such as "tea-balls". More particularly this invention is directed to improved means to make individually wrapped "tea-ball" packages or similar articles and to the method of applying the sanitary wrapper thereof. The invention may be adapted to form a machine driven to cooperate with apparatus for filling and closing small bags, as for example, "tea-balls" having a thread or string handle terminated by a tag or label whereby such finished "tea-balls" after passing to a discharging conveyor or the like is automatically shaped and wrapped in suitable sheet material to form an individual package.

Among the objects of the invention is the provision of a bag wrapping machine of the character described which shall comprise few and simple parts for taking finished bags as discharged from a bag filling and closing machine, transfer and individually wrapping same, which shall extend a thread or string handle terminated by a tag of each bag outside of the wrapper enclosing the bag, which shall provide a machine of inexpensive construction and a method which is easily carried out, and which machine and method shall be practical and efficient to a high degree in use.

Other objects of this invention will in part be obvious and in part hereinafter pointed out.

The invention accordingly consists in the features of construction, combinations of elements and arrangement of parts which will be exemplified in the construction and method hereinafter described and of which the scope of application will be indicated in the following claims.

In the accompanying drawings, in which is shown a possible illustrative embodiment of this invention, Fig. 1 is a side elevational view of a "tea bag" wrapping machine embodying the invention shown in cooperation with a bag filling and closing apparatus;

Fig. 3 is a top plan view of part of Fig. 1;

Fig. 4 is a top plan view of the conveyor yoke;

Figure 1:
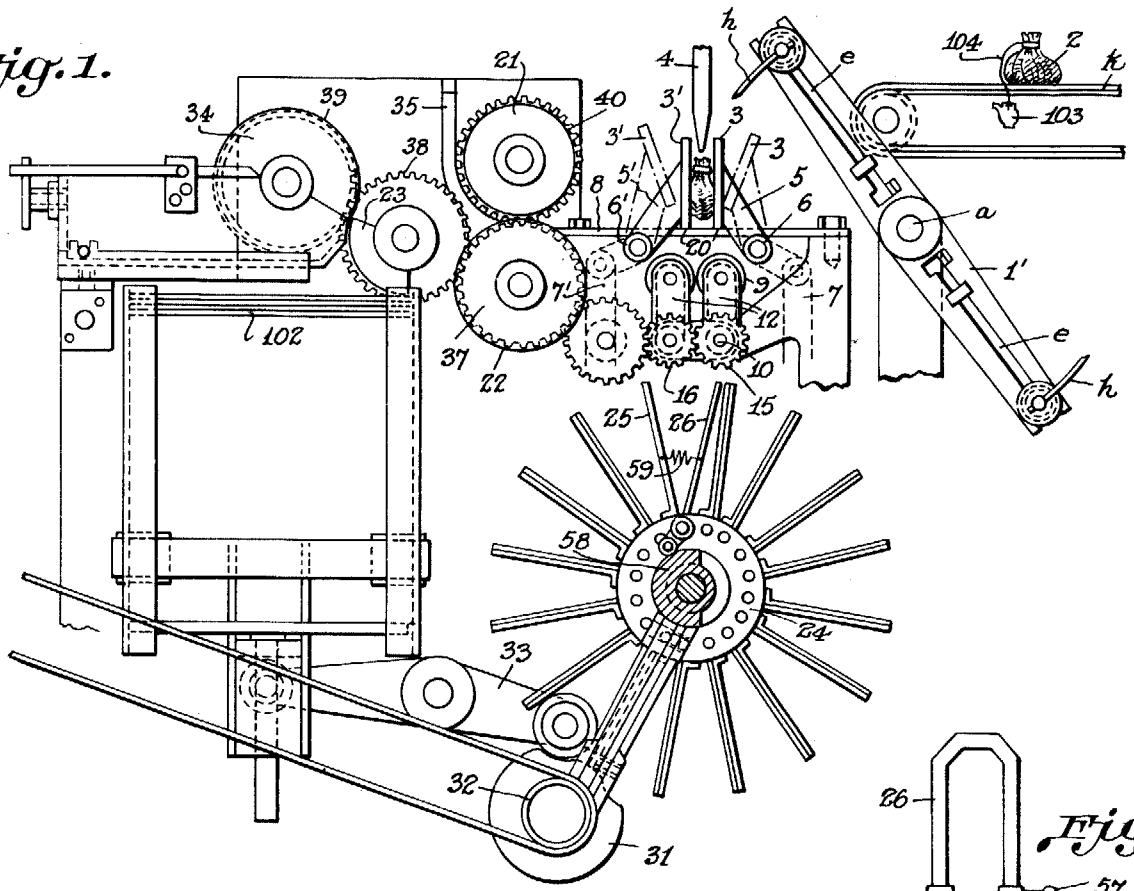
Figure 2:
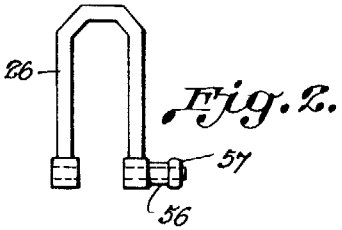
Fig. 2 is a front elevational view of the clamping frame with its oscillatable arm.
Figure 5:
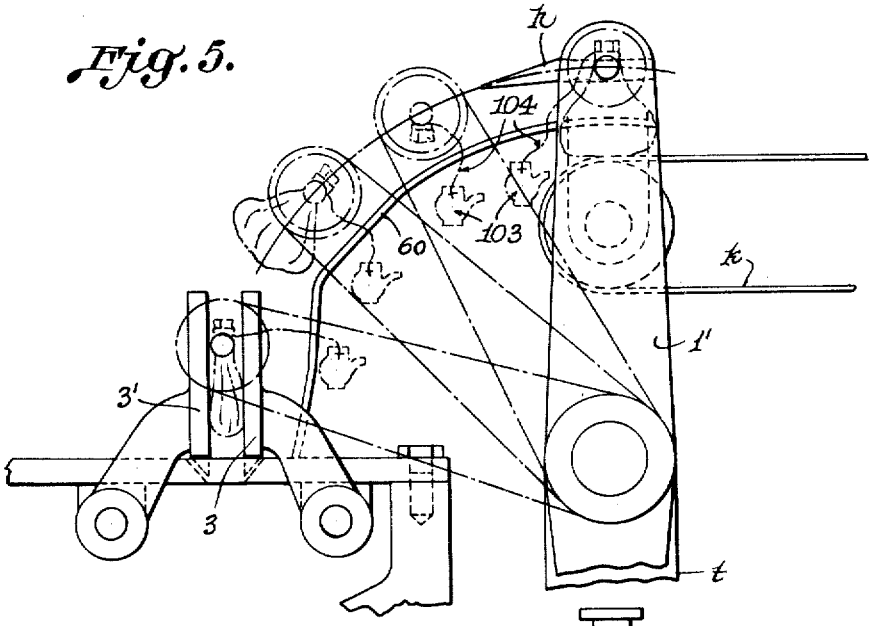
Fig. 5 is a fragmentary side view showing the turning of the bag during the movement from the conveyor belt to the pressing cheeks.
Figure 6:
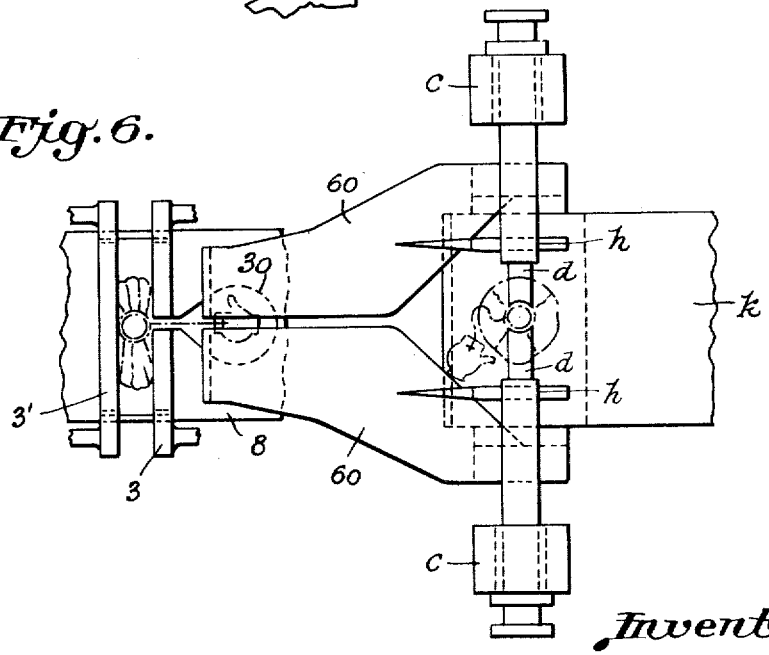
Fig. 6 is a top plan view showing the parts shown in Fig. 5.

Referring in detail to the drawings, as seen from Figs. 1 and 4, a hollow shaft *a* journaled in the machine frame and driven by spur wheels *r* and the like carries a fixed yoke formed by two arms *l*, *l'*. The shaft *a* is supported by bearings *s* and *t*. Sleeve-shaped bearings *c* in which grippers *d* are loosely mounted are provided in the two arms *l*, *l'*. The grippers *d* have tines *h* for preliminarily folding a paper sheet 100 in which the bag 2 is wrapped. As soon as the grippers *d* come into the same plane as the bag 2, they close. The bag 2 thus gripped is moved in the arc of a circle, being thereby turned and brought on the wrapping sheet. The paper sheet for wrapping the bag 2 is taken from a pile 102 below the cylinder segment 23 between cylinders 21, 22 and conveyed by these cylinders to the machine table 8. The folding of the sheet is effected by the approachment of the cheeks 3, 3', the slightly rounded ribs 20 on the lower end project into the table 8 as seen from Fig. 1, and the inclined end of surface of each cheek is situated at a distance of ½ mm. in parallel relation to the inclined surfaces of the table 8 so that the paper can be inserted therebetween as seen in Fig. 5.

By the downward movement of the shaping element 4 the folding of the paper is continued and the bag 2 at the same time brought into the wrapping. The pile 102 of paper sheets is raised by the cam disc 31 keyed on the shaft 32 through the intermediary of the two-armed lever 33 as soon as the cylinder segment is above the pile 102 of sheets. The sheet adhering to the cylinders 21, 22 is stripped off the cylinder segment 23 by a stripper 35 provided on the machine frame. The cylinders are driven by the toothed wheel 36 through the intermediary of the toothed wheels 37, 38, 39 and 40.

The grippers *d* are controlled by the stationary cam roller *g* through the intermediary of a lever *e*, the grippers being normally held closed by the spring *v* in such a manner that the ends of the grippers *d* approach for gripping the bag 2 and open wide after delivering the bag 2 to the pressing cheeks 3, 3'. The plate 3 is slotted as shown in Fig. 3 to accommodate the string handle 104 terminated by a label or tag 103. The thread or string-handle 104 and the label or tag 103 are brought into the proper position by the spreader 60. The two pressing cheeks 3, 3' located above the machine table 8, are rigidly carried by arms 5, 5' extending through openings in the table 8, and are oscillatable on pivot pins 6, 6'.

The bag 2 held by the grippers *d* would normally in swinging from the conveyor band or belt *k* arrive between the cheeks 3, 3' tipped over or upside down with the neck of the bag extending downwards, consequently the bag 2 must not only be swung by the yoke when being moved from the conveyor belt *k* but must also be turned around its own axis in order to keep the thread or string handle 104 with the label or tag 103 away from the bag 2 and to bring the same into the position shown in Fig. 3 with the aid of the spreader 60. For this purpose the grippers *d* are loosely mounted in their sleeves. The discs mounted on the grippers *d* bear against the levers *e* so that the grippers can be operated and closed, have teeth on their circumference which mesh with a curved rack mounted on the machine frame. The bag 2 is thus turned by these means on the axis as aforementioned during its transport from the conveyor belt *k* besides being swung from the latter to the position between cheeks 3, 3'. The pressing cheeks 3, 3' are pivoted outwardly and separated by means of the levers 7, 7' acting upon the arms 5, 5' and controlled by cam rollers or the like (not shown). Above the pressing cheeks 3, 3' the vertically reciprocating shaping element 4 is mounted which serves to push the bag 2 in between the pressing cheeks for shaping the upper surface thereof.

The shaping element 4 has in its side engaging the bag 2 a recess shaped to conform with the upper portion of the bag 2 so that during the flattening of the bag 2 by means of the cheeks 3, 3' the bag 2 will not be pressed in an upward direction, that is, beyond the pressure surface of the element 4. The pressing cheeks 3, 3' are provided with ribs 20 which preliminarily fold the wrapping sheet delivered by the pressure cylinders 21, 22 to the table 8, said table being provided with an opening 30 through which the label or tag 103 suspended on the thread or string handle 104 of the bag 2 drops.

A toothed wheel 36 is rotated by the main drive. All the parts of the machine receive their motion from this toothed wheel 36. It meshes with a toothed wheel 16 mounted on a short shaft 13, which in turn meshes with a toothed wheel 15, keyed on one end of a shaft 10, carrying at its other end a toothed wheel 17 meshing with a toothed wheel 18 keyed on a second short shaft 14 coaxial to the shaft 13. Thus the toothed wheel 36 drives the toothed wheel 16 which rotates the toothed wheel 15 together with its shaft 10 and toothed wheel 17 which drives the toothed wheel 18. The shafts 10, 13 and 14 carry conveyor rollers 9 which grip the edges of the paper containing the bag 2 and feed it to a drum 24. The rollers are driven from the shafts 10, 13 and 14 through the intermediary of belts 12 and 12'. Below the shafts 10, 13 and 14 the drum 24 is arranged which carries on its circumference pressing plates 25 and 26, between which the bag 2 wrapped in paper arrives for conveyance.

The device operates in the following manner.

The shaft *a* rotating in clockwise direction brings the grippers *d* near the bag 2. Below the conveyor belt *k*, on which the completed bag 2 made on the filling and closing machine is discharged, the grippers *d* open, owing to the pushing forward of the cam *f* by means of the cam roller *g*. The ends of the levers *e* press against the gripper plates *l* so that the grippers move apart in the sleeves *c*. As soon as the grippers are in the same plane as the bag 2, that is, slightly inclined to the horizontal plane, they again close, so that the bag 2 is clamped and held tightly between the ends of the grippers. The bag 2 thus gripped is carried by the yoke in an arc of a circle, and during such arcuate travel, there is a swinging movement imparted to the bag 2 by the rotation of the grippers *d* on their own axes, and brought between the separated cheeks 3, 3'. The label or tag 103 attached to the bag 2 by means of the thread or string handle 104 drops during this movement and is held away from the bag 2 by a spreader 60 or rod lying horizontally in front of the cheeks or by the cheek 3 itself in such a manner that the label or tag 103 cannot come between the cheeks and be packed in the paper sheet wrapping. The separated cheeks 3, 3' are then brought together through the intermediary of the levers 5, 5' and 7, 7', so that the bag 2 is compressed between the parallelly aligned cheeks. Meanwhile a paper sheet has been brought on to the table 8 from the pile 102 over pasting and pressure rollers 21, 22 and 23. During the descending movement of the cheeks 3, 3', the ribs 20 provided on the cheeks fold the paper sheet lying on the table 8. The shaping element 4 then descends and presses the bag 2 between the cheeks 3, 3' at the same time further shaping same. The paper sheet is during the operation pushed through the opening in the machine table 8, so that the side edges of the paper sheet are gripped by the conveyor rollers 9. The latter deliver the bag 2 wrapped in paper pasted on its edges between the plates 25, 26 of the drum 24.

The wrapped bag 2 is held between the clamping plates 25 and 26 which are normally urged together by a spring 59. It is necessary for the cheeks 3, 3' to be opened below the depositing point of the bag 2 by the operating and wrapping device but to close during the further rotation of the drum 24. To this end the plates 26 are loosely journaled on the drum 24 as illustrated. A pivot arm 56 rides on a cam 58, so that in cooperation with the spring 59 the oscillating movements of the plates are effected.

It will thus be seen that there is provided an apparatus and method in which the several objects of this invention are achieved and which are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A conveying and flattening device for small bags filled with tea and the like for the conveying and pressing flat of the bags, comprising in combination a conveyor band, two pressing cheeks, levers adapted to swing upwards said cheeks, a yoke adapted to bring the filled and closed bags from said conveyor band between said cheeks, and a descending shaping element above said cheeks adapted to shape the upper portion of the bag.

2. A device as specified in claim 1, comprising in combination with the rotary yoke mounted on the machine frame, grippers mounted in said yoke, a cam roller adapted to control said grippers, and a lever system adapted to transmit the movement from said cam roller to said grippers.

3. A device as specified in claim 1, comprising in combination with the pressure cheeks, a rib on the lower end of each of said cheeks adapted to effect the preliminary folding of the wrapping sheet.

4. A device as specified in claim 1, comprising in combination with a machine table and the pressure cheeks, conveyor rollers arranged under said machine table adapted to convey the wrapped bag from said cheeks.

5. A device as specified in claim 1, in which the machine table has a recess for accommodating the label attached to the bag by means of a thread during the wrapping of the bag between the pressure cheeks.

6. A device as specified in claim 1, comprising in combination with the machine frame, and the yoke rotatably mounted in the machine frame, sleeves mounted in said yokes, grippers loosely mounted in said sleeves, and adapted to rotate around their own axes whereby a bag may be swung during movement of the yoke from said conveyor to a point between said cheeks, and a thread guide adapted to guide the thread of the label during movement of the bags.

7. A method of individually packaging filled and closed bags comprising the steps of preshaping said bag, and simultaneously folding a wrapper of sheet material thereabout to form a package.

8. A method of the character described comprising the successive steps of shaping a filled and closed bag, inserting the shaped bag in a fold of sheet material during the folding operation, and sealing the bag in said material to form a package.

9. A method of individually packaging filled bags having attached string handles comprising the steps of inserting the bag in a fold of sheet material, and sealing the bag in said material to form a wrapper while keeping the bag handle outwardly extending beyond the wrapper.

10. A method of individually packaging filled bags having string handles comprising the steps of preshaping a bag, and wrapping the bag in a sheet material to enclose same with said handle extending outside the wrapper to form a package.

11. The combination of a conveyor for discharging filled and closed bags having attached string handles, a machine for wrapping the bag delivered from said conveyor in a sheet material to form a package including means to retain the string to extend outside the package.

12. A machine for wrapping filled bags comprising spaced pressing cheeks, a shaping element mounted to reciprocate between said cheeks, a table having an opening therein positioned to register the latter with space between said cheeks, and wrapper enclosing means located to receive a bag inserted from said cheeks between a folded sheet material adapted to seal said bag in the sheet material to form a package.

13. The machine defined in claim 12 in which guide means are provided adapted to permit passage of a string handle attached to the bag to retain said handle outside the package.

14. In combination, a discharge portion of a filling and closure bag, a wrapping machine, and means to move the bag from said portion to the machine, said machine comprising a bag shaping means, means for folding sheet material for enclosing the shaped bag in said material, and sealing means for forming a wrapped package containing said bag.

15. The combination set forth in claim 14 in which said machine includes means for retaining a string handle attached to said bag outside the wrapped package.

16. In combination with a discharge means from a bag filling and closing machine, a wrapping apparatus, means for feeding the bag from said discharge means to the wrapping apparatus, and means for flattening the bag in the path of movement of the bag from said discharge means to the apparatus.

17. In combination with conveyor discharge means from a bag filling and closing apparatus, a wrapping machine for enclosing the bag in a sheet material to form a package including means for transferring the bag from said conveyor discharge means to said machine, and means for flattening the bag prior to enclosing same.

ADOLF RAMBOLD.